US010462088B2

United States Patent
Friend et al.

(10) Patent No.: US 10,462,088 B2
(45) Date of Patent: Oct. 29, 2019

(54) PROVIDING SOCIAL INSIGHT IN EMAIL

(71) Applicant: MICROSOFT TECHNOLOGY LICENSING, LLC, Redmond, WA (US)

(72) Inventors: Ned Bearer Friend, Bellevue, WA (US); Josh Meisels, Seattle, WA (US); Christian Piccolo, Seattle, WA (US); Sherry Lin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 14/972,126

(22) Filed: Dec. 17, 2015

(65) Prior Publication Data
US 2017/0180297 A1   Jun. 22, 2017

(51) Int. Cl.
*H04L 12/58* (2006.01)
*G06Q 10/10* (2012.01)

(52) U.S. Cl.
CPC .......... *H04L 51/22* (2013.01); *G06Q 10/107* (2013.01); *H04L 51/32* (2013.01)

(58) Field of Classification Search
CPC ......... H04L 51/22; H04L 51/34; G06Q 10/10; G06Q 10/107
See application file for complete search history.

(56) References Cited

U.S. PATENT DOCUMENTS

| | | | |
|---|---|---|---|
| 7,085,812 B1 | 8/2006 | Sherwood | |
| 7,386,589 B1 * | 6/2008 | Tanumihardja | G06Q 10/10 709/204 |
| 7,720,923 B2 | 5/2010 | Lipton et al. | |
| 9,306,899 B1 * | 4/2016 | Vendrow | H04L 51/34 |
| 2004/0073616 A1 * | 4/2004 | Fellenstein | G06Q 10/107 709/206 |
| 2004/0186884 A1 | 9/2004 | Dutordoir | |
| 2005/0160145 A1 | 7/2005 | Gruen et al. | |
| 2005/0210116 A1 | 9/2005 | Samson | |
| 2006/0041626 A1 * | 2/2006 | Chen | H04L 51/34 709/206 |
| 2008/0281925 A1 | 11/2008 | Kwak | |
| 2009/0037537 A1 * | 2/2009 | Callanan | G06Q 10/107 709/206 |
| 2009/0228792 A1 * | 9/2009 | van Os | G06F 3/0488 715/702 |

(Continued)

OTHER PUBLICATIONS

"International Search Report and Written Opinion Issued in PCT Application No. PCT/US2016/065477", dated Jan. 25, 2017, 11 Pages.

(Continued)

*Primary Examiner* — Jason D Recek
*Assistant Examiner* — Lesa M Kennedy
(74) *Attorney, Agent, or Firm* — Michael Best & Friedrich LLP

(57) ABSTRACT

A social insight is provided in an email. A communication application initiates operations to provide the social insight by receiving action(s) performed on the email by a recipient from a tracking service. The tracking service is authorized to track the action(s) and provide the action(s) for analysis. The action(s) are also tracked in real time. A feedback is generated based on the action(s). The feedback is presented to a participant within the email or a conversation associated with the email.

16 Claims, 7 Drawing Sheets

(56) References Cited

U.S. PATENT DOCUMENTS

| | | | |
|---|---|---|---|
| 2010/0076804 A1* | 3/2010 | Jones | G06Q 10/109 |
| | | | 705/7.18 |
| 2010/0250691 A1* | 9/2010 | Tomkow | H04L 51/30 |
| | | | 709/206 |
| 2011/0055333 A1* | 3/2011 | Guy | G06O 10/107 |
| | | | 709/206 |
| 2012/0198010 A1 | 8/2012 | Bremner et al. | |
| 2012/0231770 A1* | 9/2012 | Clarke | H04L 51/34 |
| | | | 455/414.1 |
| 2012/0284618 A1 | 11/2012 | Bailor et al. | |
| 2013/0132495 A1* | 5/2013 | Low | G06Q 10/107 |
| | | | 709/206 |
| 2014/0280616 A1* | 9/2014 | Ramanathan | H04L 51/22 |
| | | | 709/206 |
| 2014/0344369 A1 | 11/2014 | Goldberg et al. | |
| 2014/0379816 A1* | 12/2014 | Lin | H04L 51/24 |
| | | | 709/206 |
| 2015/0082189 A1 | 3/2015 | Baer et al. | |

OTHER PUBLICATIONS

"Read Receipts", Retrieved on: Sep. 28, 2015, Available at: https://support.google.com/a/answer/1385059?rd=2.

"Yesware", Published on: Jul. 23, 2015, Available at: https://itunes.apple.com/us/app/yesware-email-tracking-for/id869070690?mt=8.

"MailTracker", Published on: Oct. 10, 2014, Available at: https://itunes.apple.com/us/app/mailtracker/id773122020?ls=1&mt=8.

Amitay, Daniel, "iTrackMail—Easy Email Tracking and Read Receipts ", Published on: Apr. 5, 2015, Available at: https://itunes.apple.com/us/app/itrackmail-easy-email-tracking/id533886215?mt=8.

Bergmann, Stephen, "New Zimbra Mail Coming Soon", Published on: Apr. 13, 2015, Available at: http://community.mxtoolbox.com/blog/new-zimbra-mail-coming-soon/.

"Read Notify is the Fastest, Easiest, most Reliable Way to find out When Email You've Sent Gets Read", Published on: Feb. 7, 2002, Available at: http://www.readnotify.com/readnotify/text/faq.asp.

"GetNotify—Email Tracking & Email Marketing Features & Benefits", Published on: Jul. 14, 2009, Available at: http://www.getnotify.com/.

"Get Delivery and Read Receipt Confirmations", Retrieved on: Sep. 28, 2015, Available at: https://support.office.com/en-za/article/Get-delivery-and-read-receipt-confirmations-b4abad96-398d-4ba3-9fed-bfb988642d75.

Viticci, Federico, "Spark Review_ Smart Email", Published on: May 29, 2015, Available at: https://www.macstories.net/reviews/spark-review-smart-email/.

"SecondWritten Opinion Issued in PCT Application No. PCT/US2016/065477", dated Dec. 7, 2017, 7 Pages.

* cited by examiner

PROVIDING SOCIAL INSIGHT IN EMAIL

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications facilitate communication and recipient tracking.

Vast number of communications with recipients complicate discovery and management of future actions by the recipients on the communications. Indeed, updates, changes, and/or additions to communications cause difficulties in follow-up of communications by a participant. While maintaining communications, an additional layer of complication faced by a participant includes lack of feedback from the recipient. Complications with feedback and vast number of communications may lead to mismanagement of communications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a social insight in an email. In some examples, a communication application may receive action(s) performed on an email by a recipient from a tracking service. The action(s) may be tracked in real time. A feedback associated with the actions may be generated. Next, the feedback may be presented to a participant.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
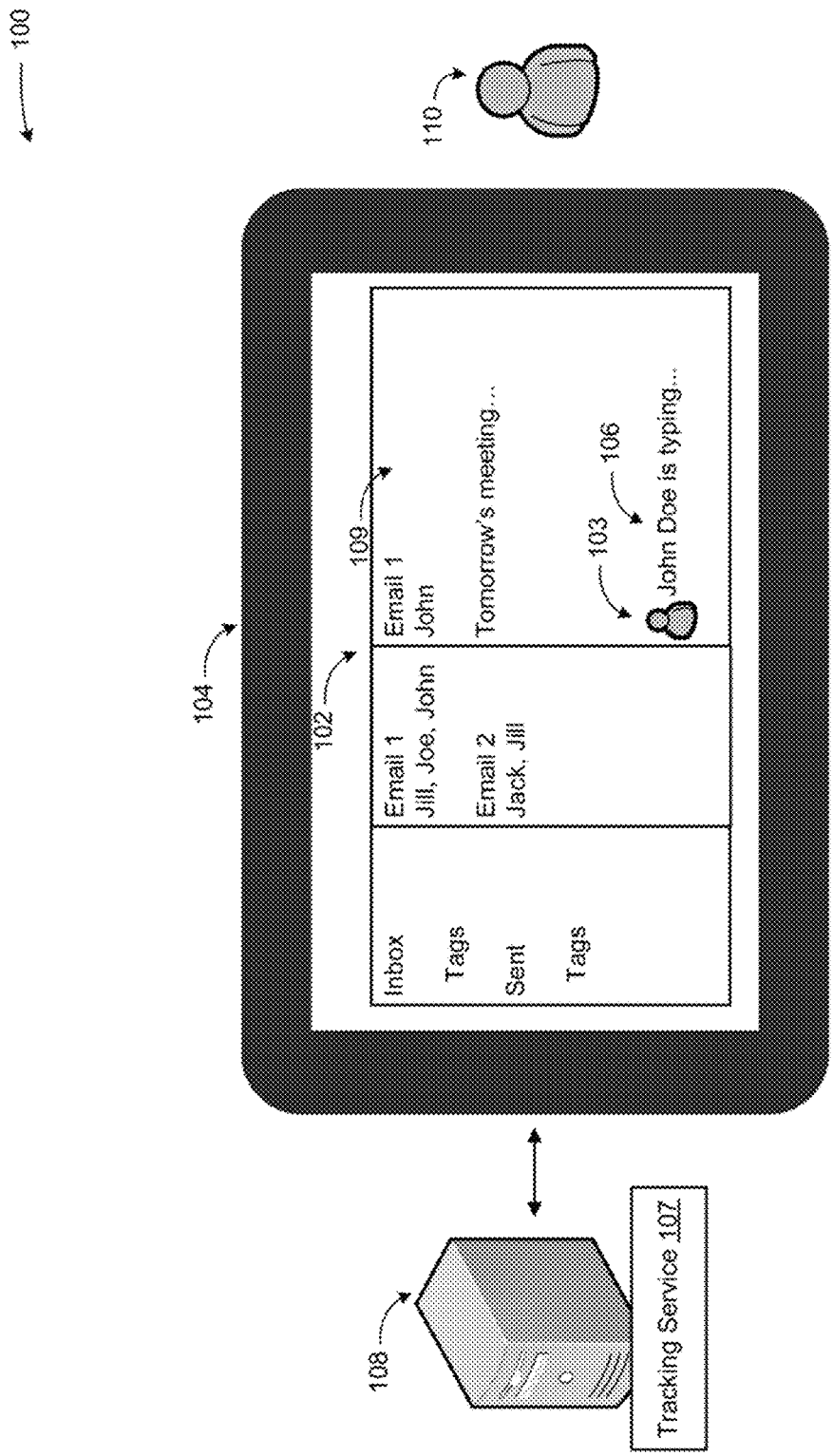
FIG. 1 is a conceptual diagram illustrating an example of providing a social insight in an email, according to embodiments.

As briefly described above, a communication application provides a social insight in an email. The communication application may include an email processing application, a document processing application, a messaging application, and/or a conferencing application, among others. In an example scenario, the communication application may receive actions performed on an email by a recipient from a tracking service. The communication application may also receive a presence information associated with the recipient. The actions and the presence information may be tracked and transmitted to the communication application in real time by the tracking service.

A feedback associated with the actions and the presence information may be generated. The presence information may include an available status, a busy status, an out of office status, and/or an offline status, among others associated with the recipient. The feedback may describe a reading action, a reply action, and/or a deletion action, among others associated with the email performed by the recipient. Next, the feedback may be presented to a participant within the email or within a conversation associated with the email.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a social insight in an email. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing a social insight in an email, according to embodiments.

In a diagram 100, a computing device 104 may execute a communication application 102. Examples of the communication application 102 may include an email processing application, a document processing application, a messaging application, and/or a conferencing application, among others. The computing device 104 may include a tablet device, a laptop computer, a desktop computer, and a smart phone, among others. The computing device 104 may include a special purpose computing device configured to provide communications management through a display component configured to display communications and/or documents, a communication component configured to transmit communications and/or documents, and/or a storage component configured to store communications and/or documents, among other components.

The computing device 104 may display the communication application 102 to a participant 110. The participant 110 may include a sender, a supervisor, and/or a group member, among others. The participant 110 may include an entity authorized to view event(s) associated with the email and recipient(s) and/or sender of the email. The participant 110 may interact with a recipient 103 through an email 109. The participant 110 may be allowed to interact with the communication application 102 through an input device or touch enabled display component of the computing device 104. The computing device 104 may also include a display device such as the touch enabled display component, and a monitor, among others to provide the communication application 102 to the participant 110.

The communication application 102 may receive actions performed on the email 109 by the recipient 103 and a presence information associated with the recipient 103 from a tracking service 107. The actions and the presence information may be tracked and transmitted to the communication application 102 in real time by the tracking service 107. The presence information may include an available status, a busy status, an out of office status, and/or an offline status, among others associated with the recipient 103. A feedback 106 associated with the actions and the presence information may be generated. The feedback may describe a reading action, a reply action, and/or a deletion action, among others associated with the email by the recipient 103. Next, the feedback 106 may be presented to the participant.

The email 109 may be stored and managed locally within the computing device 104. Alternatively, the email 109 may be retrieved from a server 108. The server 108 may include a content server and/or a communication server, among others. The server 108 may also host and manage emails. An example of the server 108 may include an email server that provides emails to be presented by the communication application 102. Additionally, the computing device 104 may communicate with the server 108 through a network. The network may provide wired or wireless communications between nodes such as the computing device 104, or the server 108, among others.

Alternatively, the server 108 may provide the communication application 102 and a user interface of the communication application 102. The computing device 104 may present the user interface of the communication application 102. The server 108 may execute operations to provide a social insight in an email. The tracking service may be a component of the communication application 102 provided by the server 108. Alternatively, the tracking service may be a stand-alone service interacting with the communication application 102 provided by the server 108.

The participant 110 may interact with the communication application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the communication application 102, embodiments are not limited to these components or system configurations and can be implemented with other system configuration employing fewer or additional components.

Figure 2:
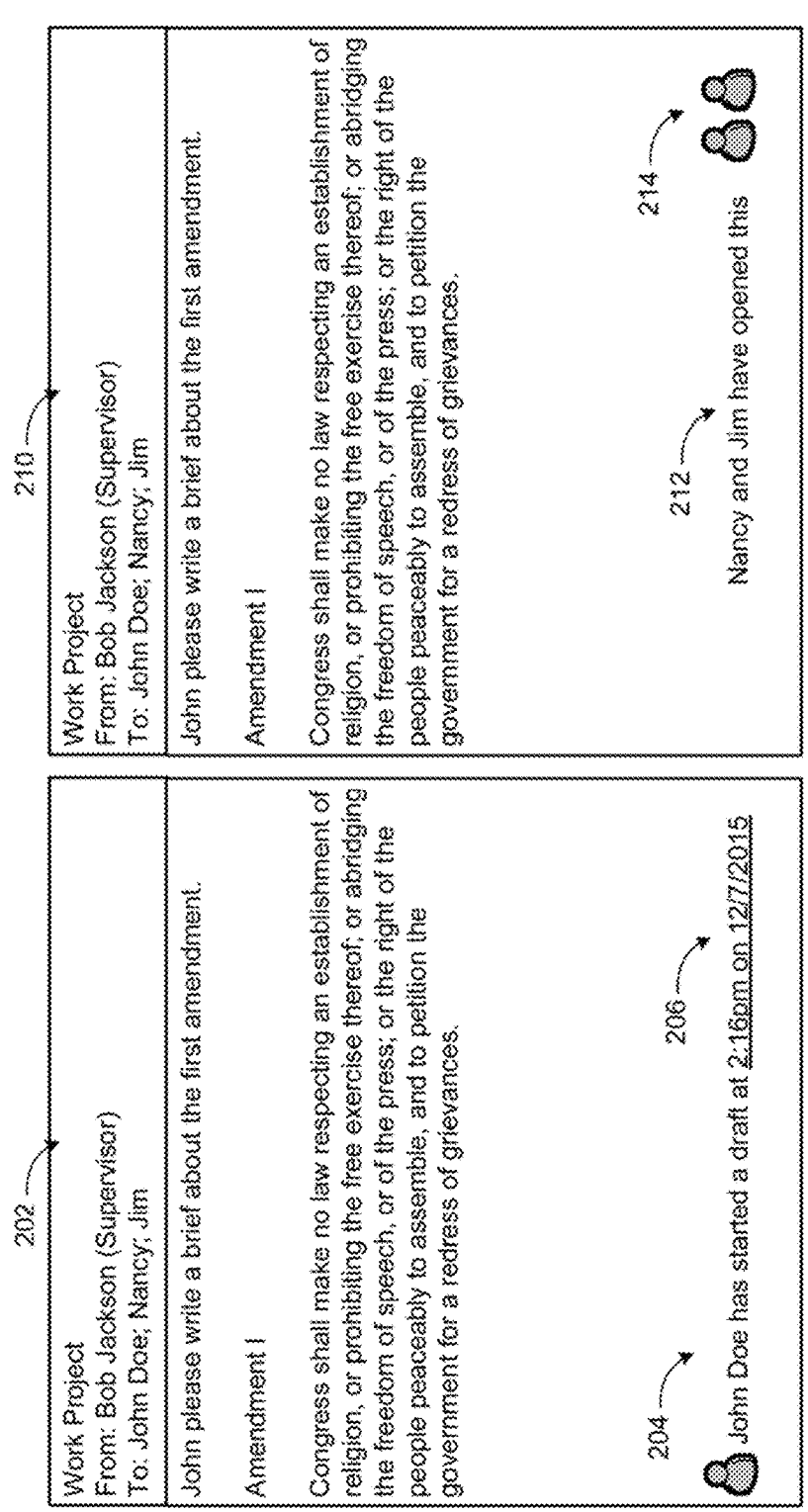
FIG. 2 is a display diagram illustrating an example of a scheme to provide a social insight in an email, according to embodiments.

FIG. 2 is a display diagram illustrating an example of a scheme to provide a social insight in an email, according to embodiments.

In a diagram 200, a communication application may provide a feedback associated with action(s) performed on an email by a recipient and/or a presence information associated with the recipient. The communication application may include an insight module and a rendering module.

The insight module of the communication application may receive actions performed on an email 202 by a recipient and a presence information associated with the recipient from a tracking service. The insight module may identify the actions as a creation of a response draft performed by the recipient. In response to the detection of the creation of the response draft, the insight module may generate a feedback 204 that describes the creation of the response draft. The feedback 204 may also provide the presence information of the recipient. The presence information of the recipient may relay a real time status associated with the feedback. Furthermore, the feedback 204 may include a timestamp 206. The timestamp 206 may indicate a date and time of the creation of the response draft. Alternatively, the timestamp 206 may describe an elapsed time from a time of the creation of the response draft. The timestamp 206 is not limited to actions associated with the response draft. The timestamp 206 may also be used to describe timing information associated with action(s) related to the feedback 204. The rendering module of the communication application may present the feedback 204.

Following the creation of the response draft, a new action performed by the recipient on the email may be received from the tracking service. The new action may be identified as a completion of the response draft (such as a transmission event associated with the response draft). In response to the completion of the response draft, the feedback may be updated to change the creation of the response draft to the completion of the response draft. The updated feedback may be presented by the rendering module.

Alternatively, a client application associated with the recipient may be incapable of providing actions performed on the email by the recipient and/or a presence information associated with the recipient. In such a scenario, the insight module may instruct the tracking service to query a server managing the email to transmit any actions performed on the email. An example action may include a read status associated with the email correlated to an access or a lack of access to the email. For example, the read status may be interpreted as "read" in response to an access to the email by the recipient. The read status may be interpreted as "unread" in response to a lack of access to the email by the recipient.

The insight module of the communication application may receive actions performed on an email 210 by a recipient and a presence information associated with the recipient from the tracking service in real time. The actions and the presence information may also be presented in real time. Updates to the actions and the presence information may also be retrieved and presented in real time.

In an example scenario, the insight module may query the tracking service to detect a reading status associated with the recipient and other recipients. The participant, the recipient and the other recipients may be in a group (such as a workgroup, and/or a team, among others). After receiving the reading status associated with the recipient and the other recipients, a feedback 212 may be generated with the reading status. The feedback may also include presence information 214 for each of the recipient and the other recipients. The presence information 214 may indicate a current status associated with the recipient and the other recipients. The presence information 214 may also include a representation for each of the recipient and the other recipients (such as a picture, a graphic, and/or an animation, among others). The rendering module of the communication application may present the feedback 212 to the participant. The feedback and/or the presence information 214 may also be actionable elements. For example, in response to an action on the feedback 212, the insight module may instruct the rendering module to display contact information associated with the recipient and the other recipient. Alternatively, in response to an action on the presence information 214, contact information associated with the recipient and the other recipient may be provided. Operations that may be executed in response to a detected action on a feedback are not limited to display of contact information. Other operations such as establishing a communication with the recipient and/or the other recipient may also be provided, among others.

The insight module may also detect a typing action performed on the email by the recipient. The typing action may be identified as a response to the email within a conversation. In response to the typing action, the rendering module may present a typing status associated with the recipient within the feedback.

Following the typing action, a new action may be received from the tracking service. The new action may be detected as a paused typing action performed on the email by the recipient. In response to the paused typing action, the feedback may be updated to change the typing status to a paused typing status associated with the recipient. Since, the tracking service provides the actions in real time, the feedback provides a typing status associated with the recipient in real time within the email.

Alternatively, following the typing action, a new action detected as an abandoned typing status or a completed typing status may be received from the tracking service. The abandoned typing status may be triggered in response to the recipient pausing a typing action beyond a time threshold. The time threshold may be dynamically adjusted based on a context associated with the participant or may be manually adjustable. The completed typing status may be detected in response to a transmission event associated with a response to the email. The insight module may update the feedback with the abandoned typing status or the completed typing status. The rendering module may display the updated feedback.

Figure 3:
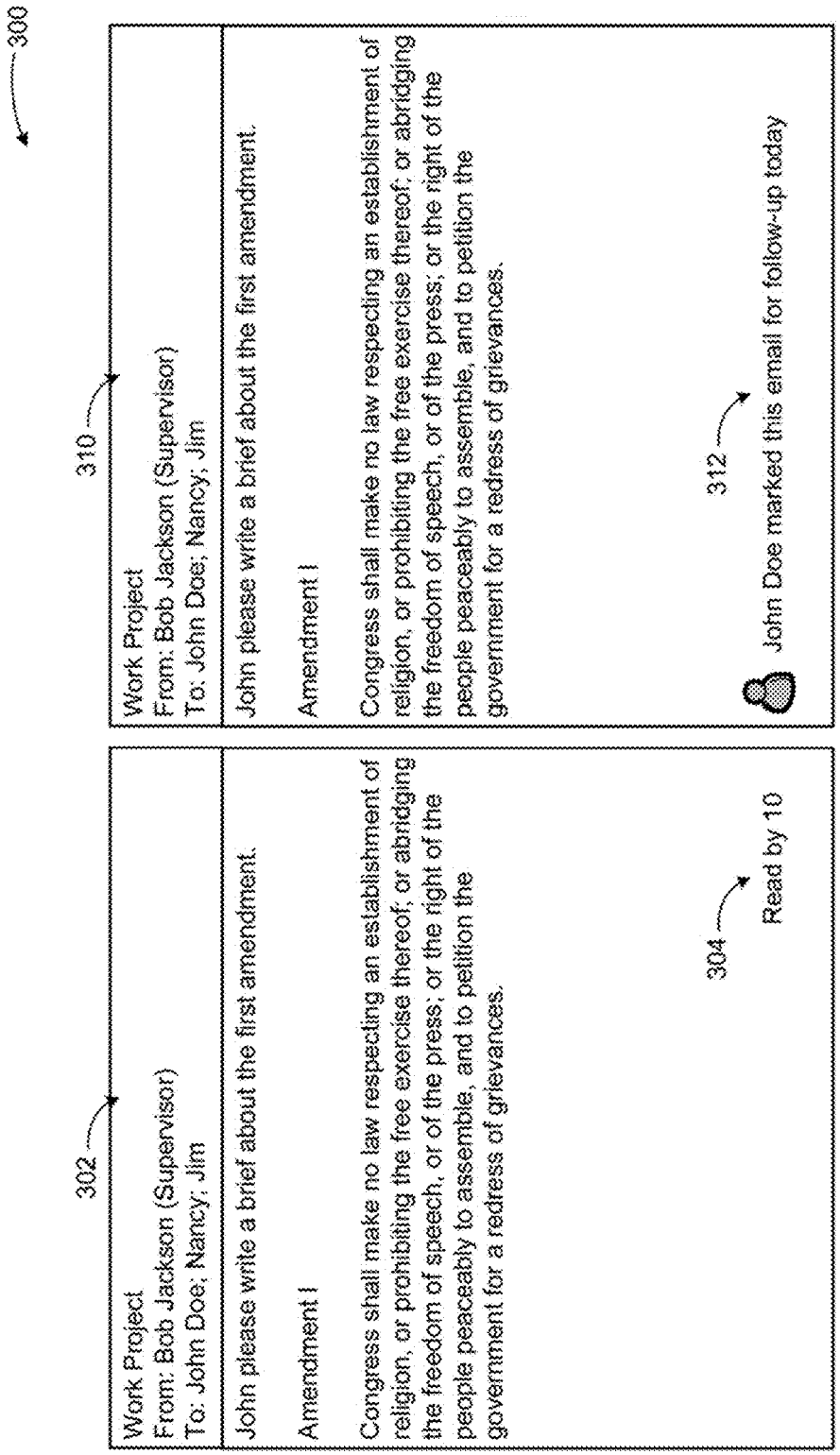
FIG. 3 is a display diagram illustrating an example of another scheme to provide a social insight in an email, according to embodiments.

FIG. 3 is a display diagram illustrating an example of another scheme to provide a social insight in an email, according to embodiments.

In a diagram 300, a communication application may provide a social insight in an email. The insight module of the communication application may receive a reading status of an email 302 associated with a group of the recipients. The group may include the recipient and other recipients. The number of the recipients in the group may be a large value. The large value may render presentation of each of the recipients within a feedback 304 unfeasible. When the number of the recipients within a group exceeds a threshold number (associated with presenting each recipient unfeasible within the feedback 304), the insight module may generate the feedback 304 with a counter reflecting a number of the recipients associated with the reading status. The rendering module may present the feedback 304.

The insight module may also identify a creation of a calendar event associated with an email 310 as the actions performed by a recipient. The calendar event may include a reminder, and/or a task, among others associated with the email 310. The reminder (or task) may prompt the recipient to reply to the email 310 or do other tasks in a time duration as specified by the reminder (or task). The insight module may generate a feedback 312 that indicate the creation of the calendar event. The rendering module may present the feedback 312.

Following the creation of the calendar event, a change to the calendar event associated with the email 310 may be received from the tracking service. The feedback may be updated to change the creation of the calendar event with the change to the calendar event. The rendering module may present the updated feedback.

A recipient may find real time tracking of actions performed by the recipient on the email (302 or 310) undesirable. As such, the communication application may procure authorization to track the actions of the recipient (prior to, during, or after initiating tracking of the actions and/or the presence information). For example, the insight module may transmit a request to the recipient to authorize tracking of the actions performed on the email (302 or 310) by the recipient (and/or the presence information of the recipient). After the authorization to track the actions is received from the recipient, the authorization may be provided to the tracking service to prompt the tracking service to track the actions of the recipient performed on the email (302 or 310) by the recipient (and/or the presence information of the recipient).

Alternatively, the communication application may establish an authorization to access actions of the recipient through a group based scenario. The insight module may detect the participant as a member of a group. The group may include a workgroup, and/or a team, among others. The group may have an authorization to track the actions performed on the email (302 or 310) by the recipient (and/or the presence information of the recipient). The authorization may be provided to the tracking service to prompt the tracking service to track the actions performed on the email (302 or 310) by the recipient (and/or the presence information of the recipient).

Figure 4:
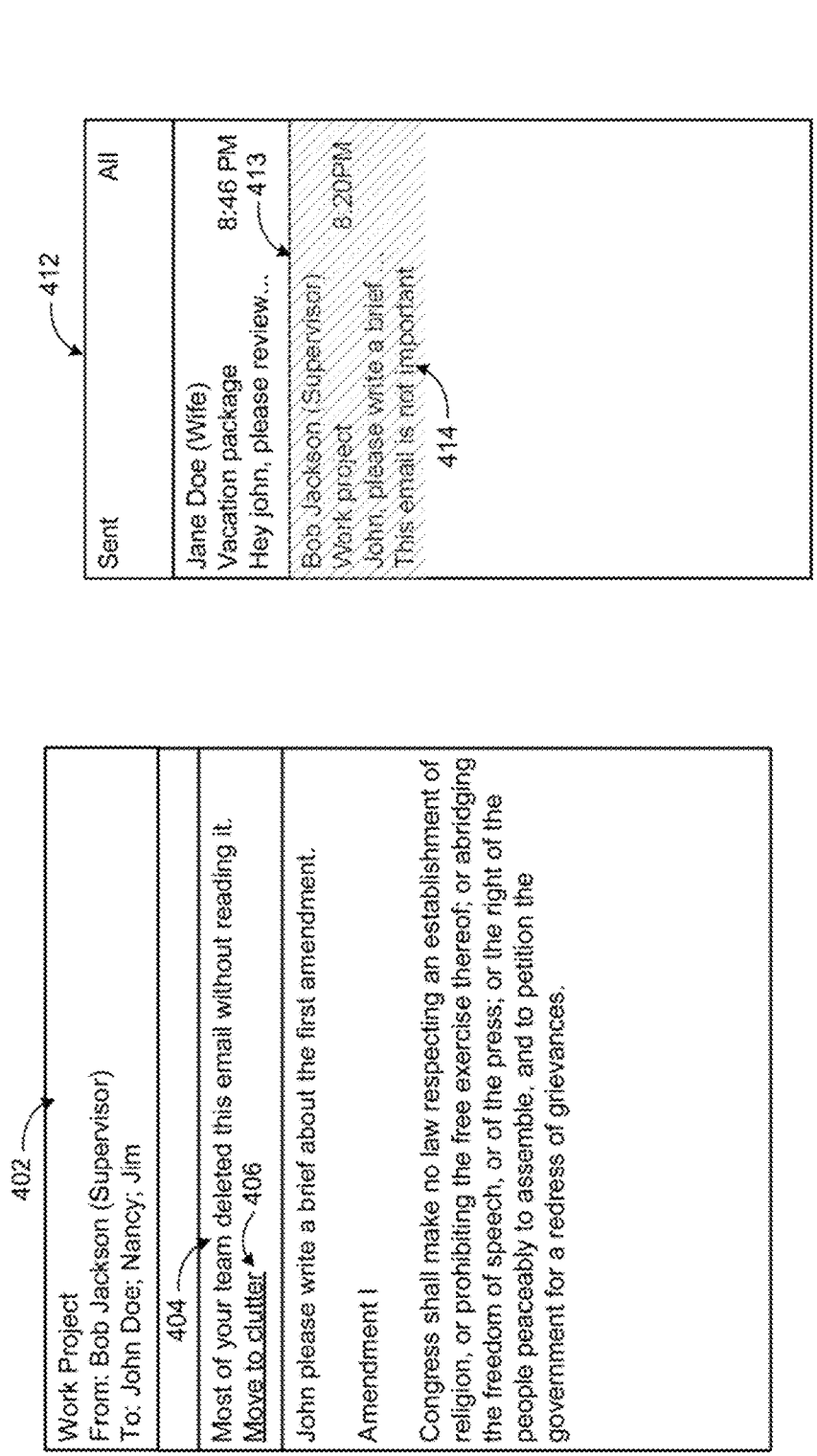
FIG. 4 is a display diagram illustrating an example of another scheme to provide a social insight in an email, according to embodiments.

FIG. 4 is a display diagram illustrating an example of another scheme to provide a social insight in an email, according to embodiments.

In a diagram 400, a communication application may provide the social insight (such as a feedback of actions performed by the recipient and a presence information of the recipient) in an email 402. An insight module of the communication application may detect the participant as a member of the group. The group may include the recipient and other recipient(s). Next, the tracking service may be queried to identify a reading status of the email by the recipient and the other recipient(s).

The tracking service may transmit the reading status of the email 402 for each of the recipient and the other recipient(s). The reading status may be detected as unread and deleted for each (or a substantial subset) of the recipient and the other recipient(s). Since an unread and deleted email by the recipient and the other recipient(s) may indicate an unimportant email, a suggestion to discard the email 402 may be included in a feedback 404. An element 406 to move the email to a trash folder or another storage location may be included within the feedback 404. In response to an activation of the element 406, operations to discard the email 402 may be executed based on input by the participant. The operations may also attempt to discard copies of the email 402 located in email accounts associated with the recipient and other recipient(s).

Alternatively, the insight module may identify an unread status and a deletion action as the actions performed on the email by the recipient. A suggestion to discard the email may be included in the feedback 414 that is generated in response to the detected unread status and the deletion action by the recipient. The feedback 414 may be displayed within a summary 413 of the email in an email summary list 412.

The insight module may also identify a read status and/or a reply action as the actions performed on the email by the recipient. The read status and/or the reply action may be interpreted to identify the email as popular and/or trending. In response, the feedback may be provided to highlight and/or promote the popular and/or trending email to other participant(s). The email associated may have an unread status in relation to the other participant(s).

As discussed above, the application may be employed to perform operations to automate presentation of a social insight within an email. An increased user efficiency with the communication application 102 may occur as a result of providing a feedback associated with an action performed by the recipient on the email. Additionally, presenting a presence information of the recipient to indicate a real time presentation of the action by the communication application 102 may reduce processor load, increase processing speed, conserve memory, and reduce network bandwidth usage.

Embodiments, as described herein, address a need that arises from a lack of efficiency between the participant 110 interacting with the communication application 102 of the computing device 104. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing a social insight in an email may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
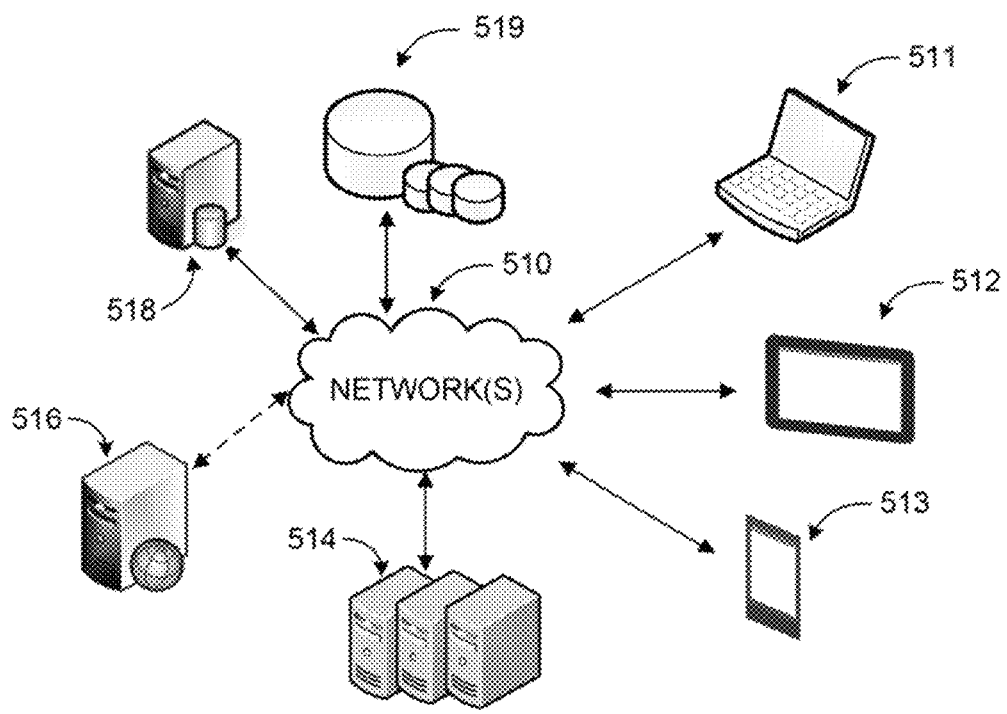
FIG. 5 is a simplified networked environment, where a system according to embodiments may be implemented.

FIG. 5 is an example networked environment, where embodiments may be implemented. A communication application configured to provide a social insight in an email may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may receive action(s) performed on an email by a recipient and a presence information of the recipient from a tracking service. The actions may be tracked in real time. A feedback associated with the action(s) and the presence information may be generated. Next, the feedback may be presented to a participant within the email or a conversation associated with the email. The communication application may store data associated with the email in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a social insight in an email. Furthermore, the networked environments discussed in FIG. 5 are for illustration purposes only. Embodiments are not limited to the example applications, modules, or processes.

Figure 6:
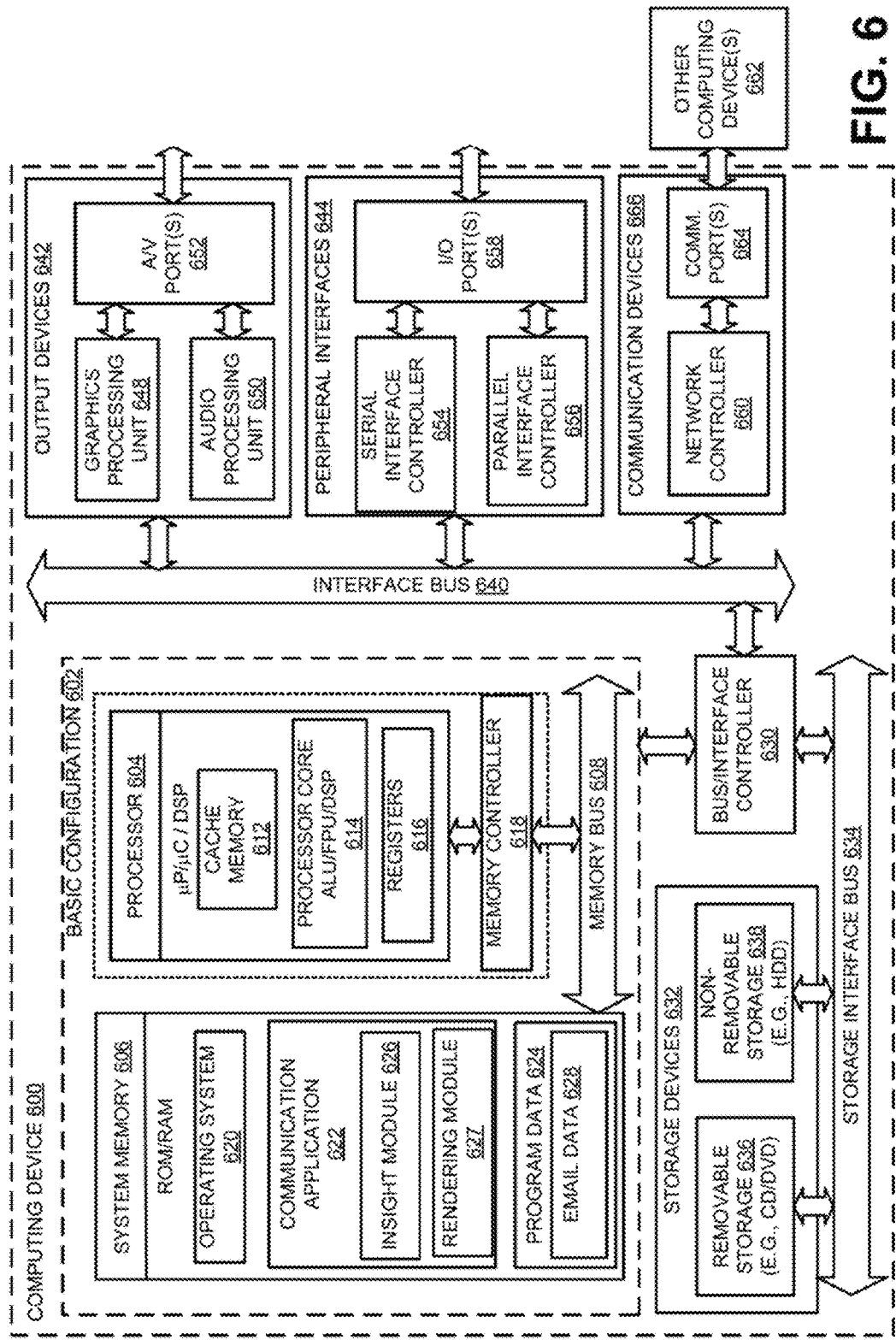
FIG. 6 is a block diagram of an example computing device, which may be used to provide a social insight in an email, according to embodiments.

FIG. 6 is a block diagram of an example computing device, which may be used to provide a social insight in an email, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 may include components such as an insight module 626 and a rendering module 627. The insight module 626 and the rendering module 627 may execute the processes associated with the communication application 622. The insight module 626 may receive action(s) performed on an email by a recipient and a presence information of the recipient from a tracking service. The actions may be tracked in real time. A feedback associated with the action(s) and the presence information may be generated. Next, the rendering module 627 may present the feedback to a participant in real time within the email or a conversation associated with the email.

Components of the communication application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the communication application 622, displayed by the touch based device. The program data 624 may also include, among other data, email data 628, or the like, as described herein. The email data 628 may include actions performed on the email and the presence information of the recipient, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a social insight in an email. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
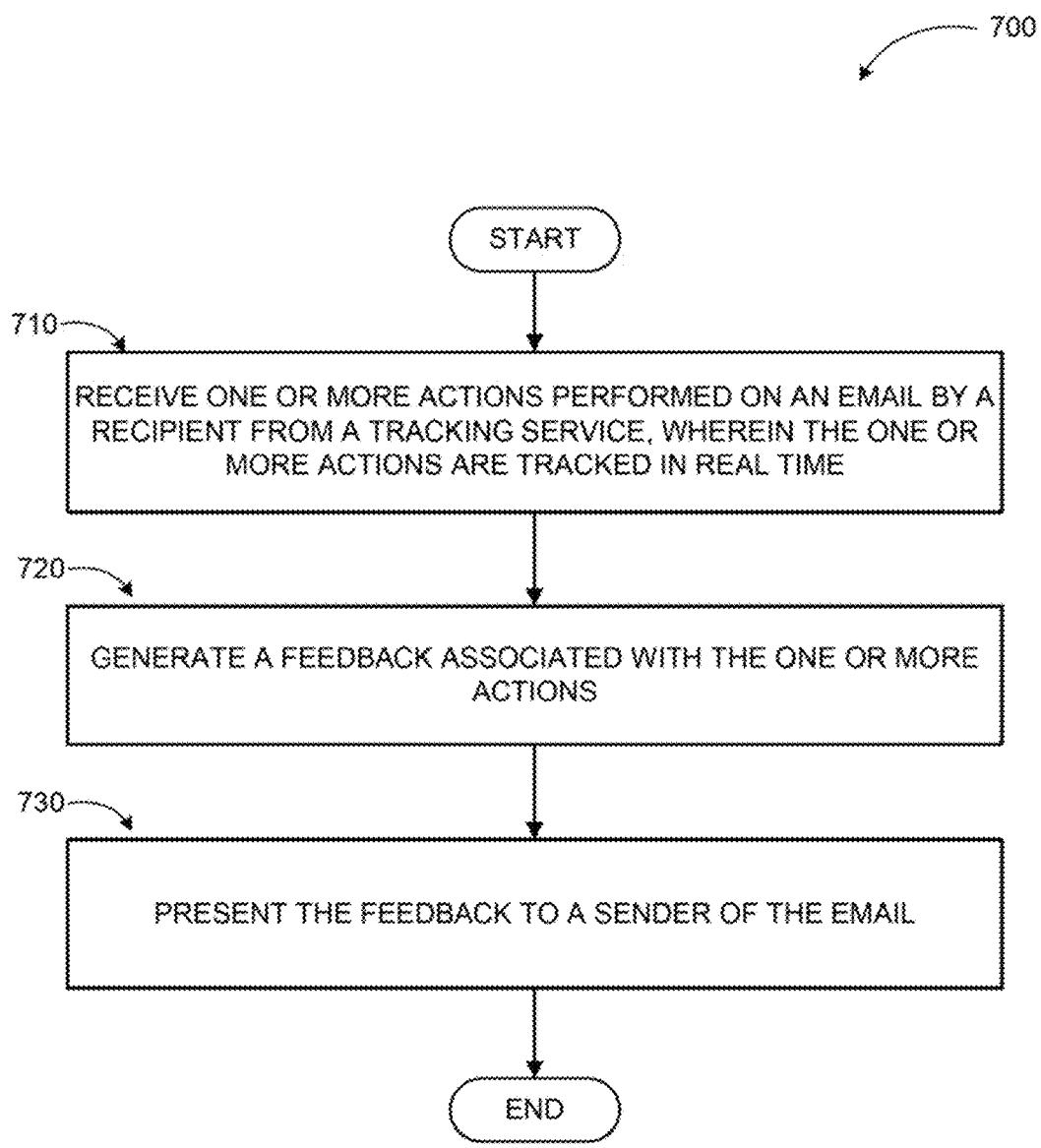
FIG. 7 is a logic flow diagram illustrating a process for providing a social insight in an email, according to embodiments.

FIG. 7 is a logic flow diagram illustrating a process for providing a social insight in an email, according to embodiments. Process 700 may be implemented on a computing device, such as the computing device 600 or another system.

Process 700 begins with operation 710, where a communication application may receive actions performed on an email by a recipient and a presence information associated with the recipient from a tracking service. The actions and the presence information may be tracked and transmitted to the communication application in real time by the tracking service. The presence information may include an available status, a busy status, an out of office status, and/or an offline status and/or among others associated with the recipient.

At operation 720. A feedback associated with the actions and the presence information may be generated. The feedback may describe a reading action, a reply action, and/or a deletion action, among others associated with the email performed by the recipient. Next, at operation 730, the feedback may be presented to the participant. Future received actions may be used to update the feedback.

The operations included in process 700 are for illustration purposes. Providing a social insight in an email may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device for providing a social insight in an email is described. The computing device includes a display device, a memory configured to store instructions associated with a communication application, and one or more processors coupled to the memory and the display device. The one or more processors execute the communication application in conjunction with the instructions stored in the memory. The communication application includes an insight module and a rendering module. The insight module is configured to receive one or more actions performed on an email by a recipient from a tracking service, where the one or more actions are tracked in real time and generate a feedback associated with the one or more actions. The rendering module is configured to present, on the display device, the feedback to a participant.

In other examples, the insight module is further configured to detect a typing action as the one or more actions performed on the email by the recipient and indicate a typing status associated with the recipient within the feedback. The insight module is further configured to receive a paused typing action as a new action performed on the email by the recipient from the tracking service and update the feedback to change the typing status to a paused typing status associated with the recipient. The insight module is further configured to receive one of: an abandoned typing action and a completed typing action as a new action performed on the email by the recipient from the tracking service and update the feedback to change the typing status to one of: an abandoned typing status and a completed typing status associated with the recipient.

In further examples, the insight module is further configured to identify a reading status of the email by the recipient as the one or more actions performed by the recipient and indicate the reading status associated with the recipient within the feedback. The insight modules is further configured to query the tracking service to detect a reading status associated with the recipient and one or more other recipients of the email, receive the reading status associated with the recipient and the one or more other recipients of the email, and indicate the reading status associated with the recipient and the one or more other recipients within the feedback. The insight module is further configured to detect a creation of a response draft as the one or more actions performed by the recipient, indicate the creation of the response draft within the feedback, receive a completion of the response draft as a new action performed by the recipient from the tracking service, and update the feedback to change the creation of the response draft to the completion of the response draft.

In other examples, the insight module is further configured to detect a creation of a calendar event associated with the email as the one or more actions performed by the recipient, indicate the creation of the calendar event within the feedback, receive a change to the calendar event as a new action performed by the recipient from the tracking service, and update the feedback to change the creation of the calendar event with the change to the calendar event.

In some examples, a method executed on a computing device for providing a social insight in an email is described. The method includes receiving one or more actions performed on an email by a recipient and a presence information associated with the recipient from a tracking service, where the one or more actions and the presence information are tracked in real time, generating a feedback associated with the one or more actions and the presence information, and presenting the feedback to a participant.

In other examples, the method further includes transmitting a request to the recipient to authorize tracking of the one or more actions performed on the email by the recipient, receiving an authorization to track the one or more actions from the recipient, and providing the authorization to the tracking service to prompt the tracking service to track the one or more actions performed on the email by the recipient. The method further includes detecting the participant as a member of a group, where the group has an authorization to track the one or more actions performed on the email by the recipient and providing the authorization to the tracking service to prompt the tracking service to track the one or more actions performed on the email by the recipient.

In further examples, the method further includes detecting the participant as a member of a group, where the group includes the recipient and one or more other recipients, querying the tracking service to identify a reading status of the email by the recipient and the one or more other recipients, detecting the reading status of the email by the recipient and the one or more other recipients as unread and deleted, and inserting a suggestion to discard the email within the feedback.

In other examples, the method further includes detecting an unread status and a deletion action as the one or more actions performed on the email by the recipient, including a suggestion to discard the email within the feedback, and displaying the feedback within a summary of the email in an email summary list. The presence information includes one or more of: an available status, a busy status, an out of office status, and an offline status associated with the recipient.

In some examples, a computer-readable memory device with instructions stored thereon for providing a social insight in an email is described. The instructions include actions that are similar to the actions of the method.

In some examples, a means for providing a social insight in an email is described. The means for providing a social insight in an email includes a means for receiving one or more actions performed on an email by a recipient from a tracking service, where the one or more actions are tracked in real time, a means for generating a feedback associated with the one or more actions, and a means for presenting the feedback to a participant.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing a social insight in an email, the computing device comprising:
    a memory configured to store instructions associated with a communication application;
    one or more processors coupled to the memory, the one or more processors executing the communication application in conjunction with the instructions stored in the memory, wherein the one or more processors are configured to:
        transmit the email to one or more recipients;
        receive information associated with one or more actions performed by a group of the one or more recipients on the email from a tracking service, wherein the one or more actions are tracked by the tracking service in real time and include a reading status of the email by each recipient in the group of the one or more recipients on the email; and
        provide to be displayed, on a user interface of the communication application that is displaying the email, feedback based on the information associated with the one or more actions performed by the group of the one or more recipients on the email, the feedback including an element within a body of the email based on the feedback, the element activatable by a user to perform an action with respect to the email from within the email, wherein, in response to the reading status of the email being unread and deleted for a predetermined subset of the group of the one or more recipients, automatically setting the action performed in response to activation of the element to a delete action of the email.

2. The computing device of claim 1, wherein the one or more processors are further configured to:
    receive, from the tracking service, a typing action as the one or more actions performed on the email by a recipient from the group of the one or more recipients; and
    indicate a typing status associated with the recipient within the feedback.

3. The computing device of claim 2, wherein the one or more processors are further configured to:
    receive a paused typing action as a new action performed on the email by the recipient from the tracking service; and
    update the feedback to change the typing status to a paused typing status associated with the recipient.

4. The computing device of claim 2, wherein the one or more processors are further configured to:
    receive one of: an abandoned typing action and a completed typing action as a new action performed on the email by the recipient from the tracking service; and
    update the feedback to change the typing status to one of: an abandoned typing status and a completed typing status associated with the recipient.

5. The computing device of claim 1, wherein the one or more processors are further configured to:
    indicate the reading status associated with at least one of the one or more recipients on the email within the feedback.

6. The computing device of claim 1, wherein the one or more processors are further configured to:
    receive a creation of a response draft as the one or more actions performed by a recipient from the group of the one or more recipients; and
    indicate the creation of the response draft within the feedback.

7. The computing device of claim 6, wherein the one or more processors are further configured to:
    receive a completion of the response draft as a new action performed by the recipient from the tracking service; and
    update the feedback to change the creation of the response draft to the completion of the response draft.

8. The computing device of claim 1, wherein the one or more processors are further configured to:
    receive a creation of a calendar event associated with the email as the one or more actions performed by a recipient from the group of the one or more recipients; and
    indicate the creation of the calendar event within the feedback.

9. The computing device of claim 8, wherein the one or more processors are further configured to:
    receive a change to the calendar event as a new action performed by the recipient from the tracking service; and
    update the feedback to change the creation of the calendar event with the change to the calendar event.

10. A method executed on a computing device for providing a social insight in an email, the method comprising:
    transmitting a communication from a sender to one or more recipients through a communication application;

receiving information associated with one or more actions performed on the communication by a group of the one or more recipients from a tracking service, wherein the one or more actions are tracked by the tracking service in real time and include a reading status of the email by each recipient in the group of the one or more recipients on the email; and providing to be displayed, on a user interface of the communication application that is displaying the communication, feedback based on the information associated with the one or more actions performed by the group of the one or more recipients on the email, the feedback including an element within a body of the communication based on the feedback, the element activatable by a user to perform an action with respect to the email from within the email, wherein, in response to the reading status of the email being unread and deleted for a predetermined subset of the group of the one or more recipients, automatically setting the action performed in response to activation of the element to a delete action of the email.

11. The method of claim 10, further comprising:

transmitting a request to a recipient from the group of the one or more recipients to authorize tracking of the one or more actions performed on the communication by the recipient;

receiving an authorization to track the one or more actions from the recipient; and providing the authorization to the tracking service to prompt the tracking service to track the one or more actions performed on the communication by the recipient.

12. The method of claim 10, further comprising:

detecting a recipient as a member of the group, wherein the group has an authorization to track the one or more actions performed on the communication; and providing the authorization to the tracking service to prompt the tracking service to track the one or more actions performed on the communication by the recipient.

13. The method of claim 10, further comprising:

detecting an unread status or a deletion action as the one or more actions performed on the communication by a recipient from the group of the one or more recipients;

including a suggestion to discard the email within the feedback; and displaying the feedback within a summary of the communication in a communication summary list.

14. The method of claim 10, further comprising:

receiving presence information associated with the one or more recipients from the tracking service, wherein the presence information includes one or more of: an available status, a busy status, an out of office status, and an offline status associated with the one or more recipients.

15. A computer-readable memory device with instructions stored thereon for providing a social insight in an email, the instructions comprising:

transmitting the email from a sender to one or more recipients through a communication application;

receiving information associated with one or more actions performed on the email by a group of the one or more recipients from a tracking service, wherein the one or more actions are tracked in real time and include a reading status of the email by each recipient in the group of the one or more recipients on the email; and providing to be displayed, on a user interface of the communication application that is displaying the email, feedback based on the information associated with the one or more actions performed by the group of the one or more recipients on the email, the feedback including an element within a body of the email based on the feedback, the element activatable by a user to perform an action with respect to the email from within the email, wherein, in response to the reading status of the email being unread and deleted for a predetermined subset of the group of the one or more recipients, automatically setting the action performed in response to activation of the element to a delete action of the email.

16. The computer-readable memory device of claim 15, wherein the instructions further comprise:

receiving a creation of a response draft as the one or more actions performed by a recipient from the group of the one or more recipients from the tracking service;

indicating the creation of the response draft within the feedback;

receiving a completion of the response draft as a new action performed by the recipient from the tracking service; and updating the feedback to change the creation of the response draft to the completion of the response draft.

* * * * *